United States Patent
Bai et al.

(10) Patent No.: US 9,479,378 B2
(45) Date of Patent: Oct. 25, 2016

(54) METHOD FOR SENDING DOWNLINK DATA, METHOD FOR RECEIVING DOWNLINK DATA, BASE STATION, AND USER TERMINAL

(71) Applicant: Huawei Technologies Co., Ltd., Shenzhen (CN)

(72) Inventors: Wei Bai, Shenzhen (CN); Yang Li, Beijing (CN); Xiaobo Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 69 days.

(21) Appl. No.: 14/292,442

(22) Filed: May 30, 2014

(65) Prior Publication Data

US 2014/0269249 A1 Sep. 18, 2014

Related U.S. Application Data

(63) Continuation of application No. PCT/CN2012/085742, filed on Dec. 3, 2012.

(30) Foreign Application Priority Data

Dec. 2, 2011 (CN) .......................... 2011 1 0394758

(51) Int. Cl.
*H04J 3/00* (2006.01)
*H04L 27/26* (2006.01)
(Continued)

(52) U.S. Cl.
CPC ......... *H04L 27/2636* (2013.01); *H04L 1/0003* (2013.01); *H04L 5/0007* (2013.01); *H04L 5/0094* (2013.01); *H04L 27/0008* (2013.01); *H04L 27/2628* (2013.01)

(58) Field of Classification Search
None
See application file for complete search history.

(56) References Cited

U.S. PATENT DOCUMENTS

2001/0021236 A1* 9/2001 Song ................. H04W 56/0085
375/366
2007/0011555 A1* 1/2007 Kim ..................... H04L 1/0003
714/749
(Continued)

FOREIGN PATENT DOCUMENTS

CN 1367615 A 9/2002
CN 101087286 A 12/2007
(Continued)

OTHER PUBLICATIONS

Extended European Search Report Received in European Application No. 12852510.2, Mailed Nov. 3, 2014, 7 pages.
(Continued)

*Primary Examiner* — Kevin C Harper
(74) *Attorney, Agent, or Firm* — Slater Matsil, LLP (57) ABSTRACT

Embodiments of the present invention provide a method for sending downlink data, a method for receiving downlink data, a base station, and a user terminal. The sending method includes modulating first downlink data into a first downlink signal by using a DFT-S-OFDM modulation mode; modulating second downlink data into a second downlink signal by using an OFDM modulation mode; and forming a downlink transmit signal from the first downlink signal and the second downlink signal in a multiplexing manner, and sending the downlink transmit signal to a user terminal. The base station includes a first generation module, a second generation module, and a first sending module. In the technical solutions of the present invention, downlink data is sent by using two modulation modes, DFT-S-OFDM and OFDM, thereby meeting requirements of different downlink data on EVM indexes.

22 Claims, 5 Drawing Sheets

(51) Int. Cl.
*H04L 1/00* (2006.01)
*H04L 5/00* (2006.01)
*H04L 27/00* (2006.01)

(56) References Cited

U.S. PATENT DOCUMENTS

| | | |
|---|---|---|
| 2007/0127602 A1 | 6/2007 | Guey |
| 2007/0291635 A1 | 12/2007 | Yang et al. |
| 2010/0061474 A1 | 3/2010 | Razzell |
| 2010/0067471 A1* | 3/2010 | Matsuzawa ............ H04L 5/003 370/329 |
| 2011/0013585 A1 | 1/2011 | Jitsukawa et al. |
| 2011/0038299 A1* | 2/2011 | Sugawara ............ H04L 12/189 370/312 |
| 2011/0051654 A1* | 3/2011 | Blankenship ........ H04B 7/2606 370/315 |
| 2011/0085458 A1 | 4/2011 | Montojo et al. |
| 2012/0033587 A1* | 2/2012 | Papasakellariou ...... H04J 13/00 370/277 |
| 2012/0087393 A1 | 4/2012 | Jeong et al. |
| 2013/0039291 A1* | 2/2013 | Blankenship ........... H04L 5/001 370/329 |

FOREIGN PATENT DOCUMENTS

| | | |
|---|---|---|
| CN | 101170346 A | 4/2008 |
| CN | 101675637 A | 3/2010 |
| CN | 102065047 A | 5/2011 |
| EP | 1775901 A1 | 4/2007 |
| WO | 2010143926 A2 | 12/2010 |

OTHER PUBLICATIONS

IEEE P802.11ac/D2.0, "Draft Standard for Information Technology—Telecommunications and information exchange between systems—Local and metropolitan area networks—Specific requirements," Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee, Jan. 2012, 359 pages.

* cited by examiner

METHOD FOR SENDING DOWNLINK DATA, METHOD FOR RECEIVING DOWNLINK DATA, BASE STATION, AND USER TERMINAL

This application is a continuation of International Application No. PCT/CN2012/085742, filed on Dec. 3, 2012, which claims priority to Chinese Patent Application No. 201110394758.4, filed on Dec. 2, 2011, both of which are hereby incorporated by reference in their entireties.

TECHNICAL FIELD

The present invention relates to mobile communications technologies, and in particular, to a method for sending downlink data, a method for receiving downlink data, a base station, and a user terminal.

BACKGROUND

With the exponential growth of a service volume of a user, a radio resource has gradually become an extremely scarce resource, and to provide a higher data rate by further improving the spectrum efficiency on a limited spectrum resource has become an urgent problem to be solved in wireless communications.

Currently, a highest-order modulation mode supported by a long terminal evolution (LTE) system in 3GPP is 64 quadrature amplitude modulation (QAM). In order to further improve the spectrum efficiency, the LTE system needs to support a higher-order modulation mode such as 256QAM and 1024QAM, and especially, in a scenario of small indoor coverage, the channel quality is good, and a user may obtain a high signal-to-noise ratio, which provides feasibility for an application of the modulation mode such as 256QAM and 1024QAM. The performance of the modulation mode such as 256QAM and 1024QAM relies on an error vector magnitude (EVM) index of a transmit signal, and the lower the EVM is, the better the demodulation performance at a receiving end becomes.

Currently, in the LTE system, downlink data is sent by using an orthogonal frequency division multiplexing (OFDM) modulation mode, a peak average power rate (PAPR) of a signal obtained through modulation by the OFDM is high, and an EVM index that can be reached is also high, which is not suitable for supporting the high-order modulation mode such as 256QAM 1024QAM; therefore, the improvement of the data rate is limited. In addition, when the downlink data is sent by using the OFDM modulation mode, a cell edge user cannot be effectively served.

SUMMARY

The present invention provides a method for sending downlink data, a method for receiving downlink data, a base station, and a user terminal, so as to solve the problem of a failure in improving a data rate of downlink data because of a limitation of characteristics of an OFDM signal in an existing LTE system, improve the data rate of the downlink data, and improve the quality of service for a cell edge user.

An embodiment of the present invention provides a method for sending downlink data, including modulating first downlink data into a first downlink signal by using a discrete Fourier transformation-spreading-orthogonal frequency division multiplexing (DFT-S-OFDM) modulation mode; modulating second downlink data into a second downlink signal by using an orthogonal frequency division multiplexing (OFDM) modulation mode; and forming a downlink transmit signal from the first downlink signal and the second downlink signal in a multiplexing manner, and sending the downlink transmit signal to a user terminal.

An embodiment of the present invention provides a method for receiving downlink data, including obtaining control information of a first downlink signal, where the control information includes a modulation mode corresponding to the first downlink signal and a resource location of a resource used for sending the first downlink signal, and the first downlink signal is generated by a base station modulating first downlink data by using a DFT-S-OFDM modulation mode; and receiving, by using the modulation mode in the control information, the first downlink signal sent by the base station on the resource identified by the resource location in the control information.

An embodiment of the present invention provides a base station, including a first generation module, configured to modulate first downlink data into a first downlink signal by using a DFT-S-OFDM modulation mode; a second generation module, configured to modulate second downlink data into a second downlink signal by using an OFDM modulation mode; and a first sending module, configured to form, in a multiplexing manner, a downlink transmit signal from the first downlink signal generated by the first generation module and the second downlink signal generated by the second generation module, and send the downlink transmit signal to a user terminal.

An embodiment of the present invention provides a user terminal, including an obtaining module, configured to obtain control information of a first downlink signal, where the control information includes a modulation mode corresponding to the first downlink signal and a resource location of a resource used for sending the first downlink signal, and the first downlink signal is generated by a base station modulating first downlink data by using a DFT-S-OFDM modulation mode; and a receiving module, configured to receive, by using the modulation mode in the control information, the first downlink signal sent by the base station on the resource identified by the resource location in the control information obtained by the obtaining module.

According to the method for sending downlink data, the method for receiving downlink data, the base station, and the user terminal in the embodiments of the present invention, first downlink data and second downlink data are modulated by using two modulation modes: DFT-S-OFDM and OFDM, respectively. A first downlink signal and a second downlink signal that are obtained through modulation performed by using the DFT-S-OFDM and the OFDM respectively are sent to a user terminal in a multiplexing manner, so that the DFT-S-OFDM modulation mode can be selected for downlink data whose data rate fails to be improved as being limited by the OFDM, thereby solving the problem that a data rate of partial downlink data fails to be improved because of the OFDM limitation, and improving the data rate of the downlink data.

BRIEF DESCRIPTION OF THE DRAWINGS

To illustrate the technical solutions according to the embodiments of the present invention or in the prior art more clearly, the following briefly introduces the accompanying drawings required for describing the embodiments or the prior art. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part of the embodiments of the present invention rather than all of the embodiments. All other embodiments obtained by persons of ordinary skill in the art based on the embodiments of the present invention without creative efforts shall fall within the protection scope of the present invention.

In order to solve the problem that a data rate fails to be improved because of the characteristics of OFDM when downlink data is sent by using an OFDM modulation mode in an existing LTE system, the present invention provides a method for sending downlink data based on two modulation modes: OFDM and discrete Fourier transformation-spreading-orthogonal frequency division multiplexing (DFT-S-OFDM) at the same time. The DFT-S-OFDM overcomes various defects of the OFDM when some specific downlink data is sent by using the OFDM, for example, overcomes a defect that a PAPR of the OFDM is high and an EVM index that can be reached is also high when downlink data modulated by 256QAM is sent by using the OFDM, so that the data rate of the downlink data is improved; or coverage extension of a downlink signal is implemented by using an extension module in the DFT-S-OFDM, so that the quality of service is improved for a user terminal at a cell edge. The following illustrates the technical solutions of the present invention in detail with reference to specific embodiments.

Figure 1A:
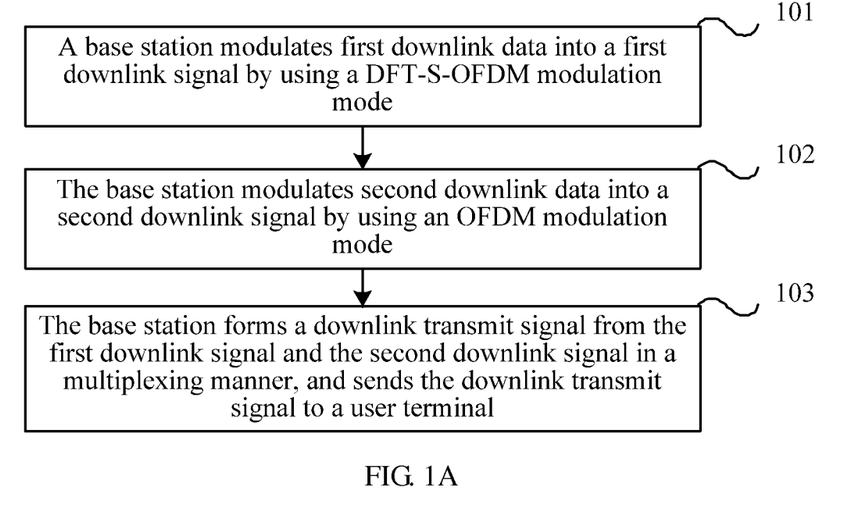
FIG. 1A is a flowchart of a method for sending downlink data according to an embodiment of the present invention.

FIG. 1A is a flowchart of a method for sending downlink data according to an embodiment of the present invention. As shown in FIG. 1A, the method of this embodiment includes the following steps.

Step 101: A base station modulates first downlink data into a first downlink signal by using a DFT-S-OFDM modulation mode.

In a practical application, data delivered by the base station to a user terminal may use different digital modulation modes, such as 64QAM and 256QAM. For downlink data modulated by some digital modulation modes, a required EVM index is relatively high, and the data may be modulated and sent by using OFDM. For downlink data modulated by some other digital modulation modes, in order to ensure that a receiving end has good demodulation performance, a required EVM index is relatively low, while an EVM index that can be reached by the OFDM is relatively high, failing to meet the requirement. Because a PAPR of the DFT-S-OFDM is relatively low and an EVM index that can be reached is relatively low, the DFT-S-OFDM is suitable for being used to send downlink data having a relatively low requirement on the EVM index. Digital modulation modes requiring a relatively low EVM index mainly refers to 256QAM and digital modulation modes whose order is higher than that of 256QAM; while the digital modulation modes whose order is lower than that of 256QAM, such as 64QAM, 16QAM, and quadrature phase shift keying (QPSK), may require a relatively high EVM index, so as to lower the cost.

Therefore, in this embodiment, the first downlink data may include: downlink data modulated by using 256QAM or a higher-order digital modulation mode.

In addition, for a user terminal at a cell edge, the signal quality is relatively poor when compared with that of a user terminal at a cell center. In order to better receive the downlink data delivered by the base station, a received signal-to-noise ratio needs to be enhanced for downlink data corresponding to the user terminal at the cell edge. That is to say, the base station may also send the downlink data to the user terminal at the cell edge by using the DFT-S-OFDM. Digital modulation is also performed on the downlink data, and a used digital modulation mode is not limited.

Therefore, in this embodiment, the first downlink data may further include: downlink data that needs to be received by the user terminal at the cell edge and on which the digital modulation is performed.

It can be seen from the above that, in this embodiment, the first downlink data includes: the downlink data modulated by using 256QAM or a higher-order digital modulation mode, and/or the downlink data that needs to be received by the user terminal at the cell edge and on which the digital modulation is performed.

The DFT-S-OFDM and the OFDM are modulation modes used to transmit the downlink data on which the digital modulation is performed, and are different from a digital modulation mode.

Based on the above, the base station determines the first downlink data from all downlink data, and then modulates the first downlink data by using the DFT-S-OFDM modulation mode, so as to form the first downlink signal.

Step 102: The base station modulates second downlink data into a second downlink signal by using an OFDM modulation mode.

Based on the first downlink data, in this embodiment, the second downlink data mainly refers to downlink data that needs to be received by the user terminal at the cell center and is modulated by using a digital modulation mode lower than 256QAM.

For the second downlink data, a required PAPR is allowed to be relatively high, a required EVM index is also relatively high, and a relevant requirement can be met by using the OFDM modulation mode to send the second downlink data.

In addition, in order to implement backward compatibility, some downlink data still needs to be modulated by adopting the OFDM modulation mode. From the perspective of the backward compatibility, in this embodiment, the second downlink data may include a broadcast channel, a synchronization channel, a control channel, a cell-specific reference signal (CRS), and so on. The control channel may be a physical downlink control channel (PDCCH), a physical control format indicator channel (PCFICH), a physical hybrid automatic repeat request indicator channel (PHICH), or the like.

Specifically, the base station determines the second downlink data, and modulates the second downlink data by using the OFDM modulation mode, so as to form the second downlink signal.

Step 103: The base station forms a downlink transmit signal from the first downlink signal and the second downlink signal in a multiplexing manner, and sends the downlink transmit signal to a user terminal.

For the first downlink signal obtained through modulation performed by using the DFT-S-OFDM and the second downlink signal obtained through modulation performed by using the OFDM, the base station sends, in the multiplexing manner, the first downlink signal and the second downlink signal to the user terminal by using time and space resources.

For example, the base station may bear an OFDM symbol of the first downlink signal and an OFDM symbol of the second downlink signal in different OFDM symbol locations in the same subframe, and send at least one same subframe to the user terminal. That is to say, the base station sends the first downlink signal and the second downlink signal to the user terminal through the same subframe.

For another example, the base station may further send the first downlink signal and the second downlink signal to the user terminal through different subframes.

The subframe refers to a time resource, and may be a subframe defined in an LTE system. Each subframe is 1 millisecond (ms), one subframe is divided into 14 small time periods, each small time period is called an OFDM symbol, and the length of one OFDM symbol is about 70 microseconds (μs).

Figure 1B:
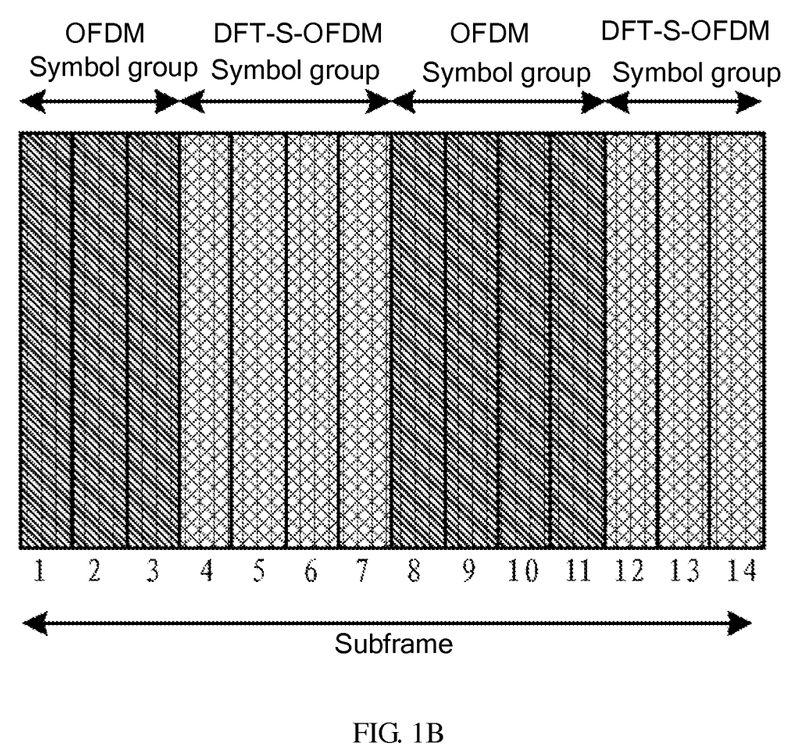
FIG. 1B is a schematic diagram showing resource allocation when a base station transmits a first downlink signal and a second downlink signal by multiplexing them in the same subframe.
Figure 1C:
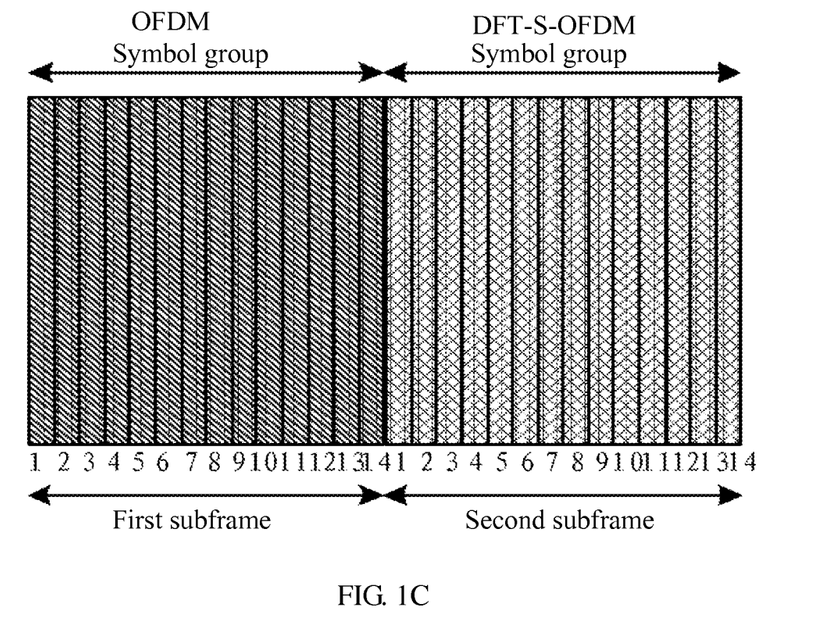
FIG. 1C is a schematic diagram showing resource allocation when a base station transmits a first downlink signal and a second downlink signal by using different subframes.

FIG. 1B is a schematic diagram showing resource allocation when a base station transmits a first downlink signal and a second downlink signal by multiplexing them in a same subframe. As shown in FIG. 1B, the first, second, third, eighth, ninth, tenth, and eleventh OFDM symbols are allocated to the second downlink signal, and the fourth, fifth, sixth, seventh, twelfth, thirteenth, and fourteenth OFDM symbols are allocated to the first downlink signal. FIG. 1C is a schematic diagram showing resource allocation when a base station transmits a first downlink signal and a second downlink signal by using different subframes. As shown in FIG. 1C, the first subframe is allocated to the second downlink signal, and the second subframe is allocated to the first downlink signal.

In this embodiment, a base station differentiates first downlink data requiring a relatively low EVM index and second downlink data requiring a relatively high EVM index from downlink data, then modulates the first downlink data and the second downlink data by using two different modulation modes: DFT-S-OFDM and OFDM, respectively, and completes sending in a multiplexing manner, so that requirements of different downlink data on EVM indexes are met at the same time when sending of the downlink data to a user terminal is implemented, and the user terminal is capable of achieving good demodulation performance, thereby improving a sending rate of the downlink data, solving the problem that the sending rate of a part of the downlink data fails to be improved because of an impact of characteristics of the OFDM when the downlink data is sent by using the OFDM and a data rate of the entire downlink data is limited accordingly.

Figure 2A:
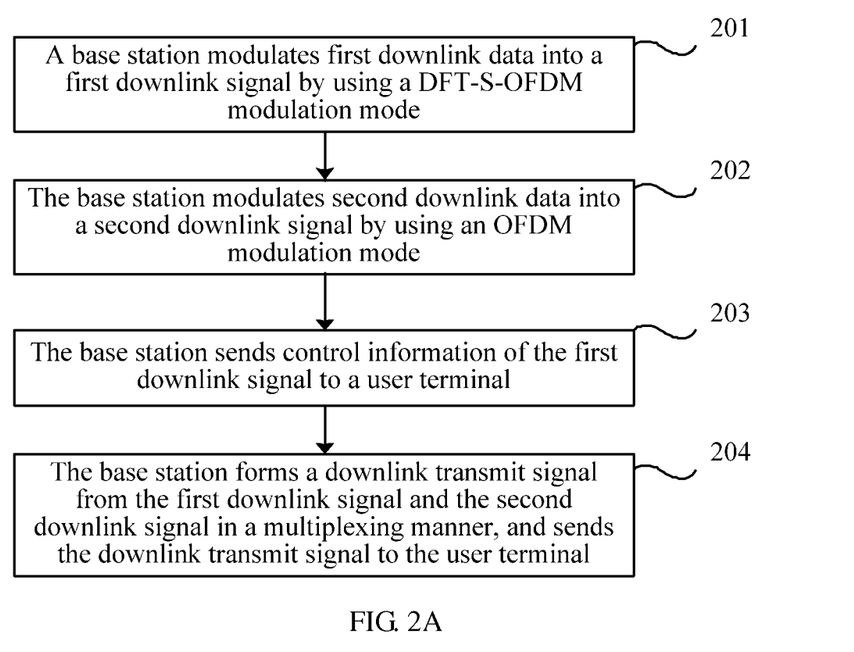
FIG. 2A is a flowchart of a method for sending downlink data according to another embodiment of the present invention.

FIG. 2A is a flowchart of a method for sending downlink data according to another embodiment of the present invention. As shown in FIG. 2A, the method of this embodiment includes the following steps.

Step 201: A base station modulates first downlink data into a first downlink signal by using a DFT-S-OFDM modulation mode.

Step 202: The base station modulates second downlink data into a second downlink signal by using an OFDM modulation mode.

For the foregoing step 201 and step 202, reference may be made to the description of step 101 and step 102, so the details are not described herein again.

Step 203: The base station sends control information of the first downlink signal and control information of the second downlink signal to a user terminal.

The control information of the first downlink signal mainly includes: a modulation mode corresponding to the first downlink signal and a resource location of a resource used for sending the first downlink signal. The modulation mode corresponding to the first downlink signal is a modulation mode used for obtaining the first downlink signal through modulation, that is, the DFT-S-OFDM. The resource location of the resource used for sending the first downlink signal mainly refers to locations or the number of OFDM symbols occupied by the first downlink signal, for example, when the first downlink signal and the second downlink signal are multiplexed in a same subframe, the resource location of the resource used for sending the first downlink signal mainly refers to serial numbers of the OFDM symbols occupied by the first downlink signal in the multiplexed subframe, for example, the fourth, fifth, sixth, seventh, twelfth, thirteenth, and fourteenth OFDM symbols. For another example, when the first downlink signal and the second downlink signal occupy different subframes, the resource location of the resource used for sending the first downlink signal mainly refers to a location of a subframe occupied by the first downlink signal, for example, the first to the fourteenth OFDM symbols in the second subframe. Certainly, the resource here may also be a resource on a frequency domain.

The base station may send the control information of the first downlink signal to the user terminal through radio resource control protocol (RRC) signaling. That is to say, the RRC signaling includes the modulation mode corresponding to the first downlink signal and/or the resource location of the resource used for sending the first downlink signal.

In addition, in the prior art, the base station generally sends, through control signaling transmitted in a PDCCH, a digital modulation mode such as 64QAM and 16QAM used by the downlink data to the user terminal, and sends a designated resource location to the user terminal, so that the user terminal correctly receives the downlink data. For downlink data using the 256QAM digital modulation mode, the user terminal may determine, according to a digital modulation mode notified in the control signaling, that a modulation mode used during receiving is the DFT-S-OFDM. However, for downlink data that needs to be received by a user terminal at a cell edge, because a used digital modulation mode is not limited, the user terminal cannot determine, according to the digital modulation mode notified in the control signaling, a modulation mode used to for receiving. Therefore, in this embodiment, the base station may further extend or modify the PDCCH, and send the control information of the first downlink signal to the user terminal through the extended or modified PDCCH (mainly referring to the control signaling transmitted in the PDCCH). For example, the base station may extend a new field in the PDCCH, and carry the modulation mode corresponding to the first downlink signal in the new field; while for the resource location of the resource used for sending the first downlink signal, it is still carried by using a field in an existing protocol. For another example, the base station may modify the definition of a certain field in an existing PDCCH, so that the field is used to carry the modulation mode corresponding to the first downlink signal; while for the resource location of the resource used for sending the first downlink signal, it is still carried by using a field in the existing protocol.

Furthermore, the base station sends the control information of the second downlink signal to the user terminal through the RRC signaling. Alternatively, the base station sends the control information of the second downlink signal to the user terminal through the PDCCH. A manner for sending the control information of the second downlink signal to the user terminal is the same as that in the prior art, which is not elaborated herein again.

Step 204: The base station forms a downlink transmit signal from the first downlink signal and the second downlink signal in a multiplexing manner, and sends the downlink transmit signal to the user terminal.

For the first downlink signal obtained through modulation performed by using the DFT-S-OFDM and the second downlink signal obtained through modulation performed by using the OFDM, the base station sends, in the multiplexing manner, the first downlink signal and the second downlink signal to the user terminal by using time and space resources.

For example, the base station may multiplex the first downlink signal and the second downlink signal in different OFDM symbol locations in the same subframe, and send them to the user terminal.

For another example, the base station may further send the first downlink signal and the second downlink signal to the user terminal through different subframes.

The first downlink signal in one subframe may be received by multiple user terminals at the same time, and the first downlink signal that needs to be received by different user terminals may be multiplexed in the subframe in a time division multiplexing or code division multiplexing manner. The subframe may be a subframe in which both the first downlink signal and the second downlink signal are multiplexed, or may also be a subframe separately occupied by the first downlink signal.

Figure 2B:
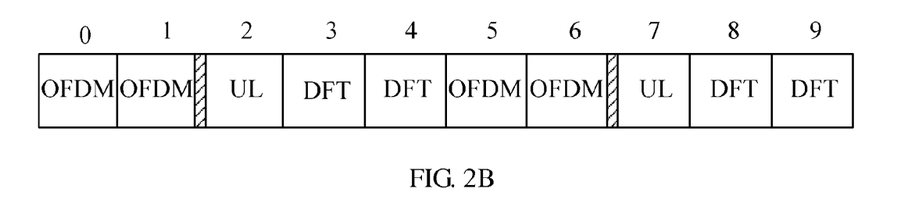
FIG. 2B is a schematic diagram showing resource allocation of a radio frame according to another embodiment of the present invention.

No matter whether the first downlink signal and the second downlink signal are sent to the user terminal through different symbol locations in the same subframe, or the first downlink signal and the second downlink signal are sent to the user terminal through different subframes, for a user terminal of the first downlink signal obtained through modulation performed by using the DFT-S-OFDM, a time-and-frequency resource allocated to the user terminal is generally a part of all time-and-frequency resources that can be used to transmit the first downlink signal in a system. In step 203, the base station sends the control information of the first downlink signal to the user terminal, that is, sends to the user terminal all the time-and-frequency resources that can be used to transmit the first downlink signal obtained through modulation performed by using the DFT-S-OFDM in the system. Taking an LTE time division duplexing (TDD) system as an example, a radio frame is formed of 10 subframes with the length of 1 ms, and each of the subframes is formed of 14 OFDM symbols. As shown in FIG. 2B, the zeroth, first, fifth, and sixth subframes are used to transmit the second downlink signal (in FIG. 2B, OFDM is used to represent the second downlink signal) obtained through modulated performed by using the OFDM; the second and seventh subframes are used to transmit an uplink signal (in the figure, UL is used to represent the uplink signal); and resources except a first OFDM symbol in the third subframe, the fourth subframe, the eighth subframe, and the ninth subframe can all be used to transmit the first downlink signal (in FIG. 2B, DFT is used to represent the first downlink signal) obtained through modulation performed by using the DFT-S-OFDM. The first subframe and the sixth subframe are TDD special subframes, and each have an idle OFDM symbol (that is, the part shown by the slashes in the figure) and an OFDM symbol used for uplink transmission. A special subframe is generally viewed as a downlink subframe. Based on resource using shown in FIG. 2B, subframes that can be used to transmit the first downlink signal obtained through modulation performed by using the DFT-S-OFDM and are sent by the base station to the user terminal in step 203 are the third subframe, the fourth subframe, the eighth subframe, and the ninth subframe, and the user terminal is notified that in the foregoing subframes, the first OFDM symbol is used to transmit the second downlink signal obtained through modulation performed by using the OFDM, while other symbols are used to transmit the first downlink signal obtained through modulation performed by using the DFT-S-OFDM.

For the convenience of description, in the following description, an OFDM symbol used to transmit the first downlink signal obtained through modulation performed by using the DFT-S-OFDM is called a DFT-S-OFDM symbol, an OFDM symbol used to transmit the second downlink signal obtained through modulation performed by using the OFDM is called an OFDM symbol, and in order to show the difference, an original OFDM symbol in a subframe is called a symbol for short. For a user terminal, when sending the user terminal a time-and-frequency resource for transmitting the first downlink signal, the base station may gather locations of all symbols (that is, all DFT-S-OFDM symbols) occupied by the first downlink signal that needs to be received by the user terminal and the modulation mode corresponding to the first downlink signal, and send the gathered locations and modulation mode to the user terminal through a subframe at a time. For example, the base station gathers DFT-S-OFDM symbol resources in all subframes to perform a joint indication instead of performing an indication in each subframe. Taking FIG. 2B as an example, DFT-S-OFDM symbol resources in the third subframe, the fourth subframe, the eighth subframe, and the ninth subframe are gathered to perform a joint indication, that is, through RRC signaling or a modified or an extended PDCCH, the DFT-S-OFDM symbol resources in the third subframe, the fourth subframe, the eighth subframe, and the ninth subframe are gathered and are then notified to the user terminal through a subframe, and at the same time, the modulation mode, DFT-S-OFDM, corresponding to the first downlink signal is also sent to the user terminal. It is assumed that DFT-S-OFDM symbols corresponding to the user terminal exist in two radio frames; the base station gathers all DFT-S-OFDM symbol resources corresponding to the user terminal in the two radio frames to perform a joint indication, which is sent to the user terminal through a subframe at a time.

For a user terminal, when sending the user terminal a time-and-frequency resource for transmitting the first downlink signal, the base station may further use a radio frame as a basis, in each radio frame, send a location of a symbol occupied in the radio frame by the first downlink signal that needs to be received by the same user terminal to the user terminal at a time, and send the modulation mode corresponding to the first downlink signal in one of the radio frames to the user terminal. Taking FIG. 2B as an example, DFT-S-OFDM symbol resources in the third subframe, the fourth subframe, the eighth subframe, and the ninth subframe in the radio frame are gathered to perform a joint indication, that is, through RRC signaling or a modified or an extended PDCCH, the DFT-S-OFDM symbol resources in the third subframe, the fourth subframe, the eighth subframe, and the ninth subframe are gathered and are then sent in the radio frame to the user terminal, and at the same time, the modulation mode, DFT-S-OFDM, corresponding to the first downlink signal is also sent in the radio frame to the user terminal.

For a user terminal, when sending the user terminal a time-and-frequency resource for transmitting the first downlink signal, the base station may further designate the number of subframes for a joint indication in advance, then send locations of symbols occupied in a designated number of subframes by the first downlink signal that needs to be received by the user terminal to the user terminal at a time, and send the modulation mode corresponding to the first downlink signal to the user terminal in the sending process. The sending to the user terminal at a time is sending, through one piece of RRC signaling or one extended or modified PDCCH, the locations of the symbols occupied in the designated number of subframes by the first downlink signal that needs to be received by the user terminal and the modulation mode corresponding to the first downlink signal to the user terminal. The designated number of subframes may be formed of all downlink subframes having a DFT-S-OFDM symbol in each radio frame. The designated number of subframes may also be formed of all downlink subframes having a DFT-S-OFDM symbol in each half radio frame. Taking FIG. 2B as an example, DFT-S-OFDM symbol resources in the third subframe and the fourth subframe are gathered to perform a joint indication, and DFT-S-OFDM symbol resources in the eighth subframe and the ninth subframe are gathered to perform a joint indication. The designated number of subframes may also be formed of downlink subframes having a DFT-S-OFDM symbol in downlink subframes feeding back uplink response information in the same subframe. Taking FIG. 2B as an example, four downlink subframes and one uplink subframe exist in each half radio frame; it is assumed that uplink response information of the ninth subframe and the third subframe is fed back in the seventh subframe, and uplink response information of the fourth subframe and the eighth subframe is fed back in the second subframe; then, DFT-S-OFDM symbol resources in the ninth subframe and the third subframe are gathered to perform a joint indication, and DFT-S-OFDM symbol resources in the fourth subframe and the eighth subframe are gathered to perform a joint indication.

It can be seen from the above that, a manner for the base station to send the user terminal the time-and-frequency resource for transmitting the first downlink signal is not limited to performing notification in each subframe, and multiple manners may be used.

Figure 2C:
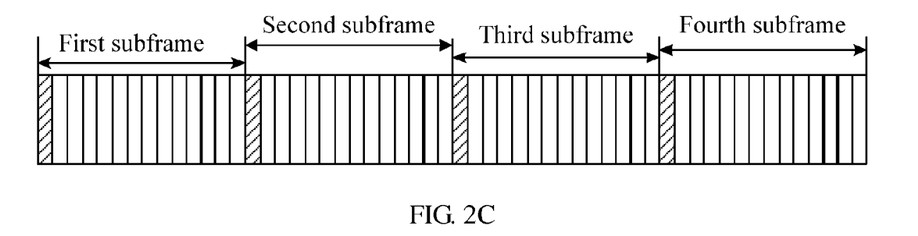
FIG. 2C is a schematic diagram of numbering a DFT-S-OFDM symbol in multiple subframes according to another embodiment of the present invention.

In the process of gathering, by the base station, DFT-S-OFDM symbol resources occupied by the user terminal to perform a joint indication, location information of a DFT-S-OFDM symbol allocated to the user terminal may be specifically indicated, or a start DFT-S-OFDM symbol allocated to the user terminal and the number of consecutively allocated DFT-S-OFDM symbols may be indicated. In the process of gathering, by the base station, the DFT-S-OFDM symbol resources occupied by the user terminal, each OFDM symbol may be used as a virtual DFT-S-OFDM symbol and uniformly numbered, or an OFDM symbol is skipped, and only a DFT-S-OFDM symbol is uniformly numbered. Taking FIG. 2C as an example, it is assumed that DFT-S-OFDM symbols of four subframes need to be gathered to perform a joint indication; each of the subframes is formed of 14 symbols, a first symbol of each of the subframes is an OFDM symbol (shown by the slash part in FIG. 2C), and the remaining 13 symbols are DFT-S-OFDM symbols. When each OFDM symbol is used as a virtual DFT-S-OFDM symbol and is uniformly numbered, symbols in the four subframes may be numbered as symbol 0 to symbol 13, symbol 14 to symbol 27, symbol 28 to symbol 41, and symbol 42 to symbol 55, respectively; symbol 1 to symbol 7 are indicated to be allocated to a first user terminal, symbol 8 to symbol 30 are indicated to be allocated to a second user terminal, and symbol 31 to symbol 55 are indicated to be allocated to a third user terminal. At this time, if a user terminal knows that symbols allocated thereto include an OFDM symbol, when data information is mapped to the allocated symbols, the OFDM symbol may be skipped, and the mapping is performed only on a DFT-S-OFDM symbol. For example, when the third user terminal knows that symbol 31 to symbol 55 are allocated thereto, and the third user terminal knows that symbol 42 is an OFDM symbol; in this case, when data information is mapped to the allocated symbols, symbol 42 is skipped, and the mapping is performed only on symbol 31 to symbol 41 and symbol 43 to symbol 55. When an OFDM symbol is skipped and only a DFT-S-OFDM symbol is uniformly numbered, DFT-S-OFDM symbols in the four subframes may be numbered as symbol 0 to symbol 12, symbol 13 to symbol 25, symbol 26 to symbol 38, and symbol 39 to symbol 51, respectively; symbol 0 to symbol 6 are indicated to be allocated to the first user terminal, symbol 7 to symbol 27 are indicated to be allocated to the second user terminal, and symbol 28 to symbol 51 are indicated to be allocated to the third user terminal.

In the subsequent description, one small time period in a subframe is still called an OFDM symbol.

In addition, when sending the first downlink signal to the user terminal, the base station further sends a demodulation pilot signal (that is, a demodulation pilot signal corresponding to the first downlink signal) for demodulating the first downlink signal to the user terminal, so as to ensure that the user terminal is capable of correctly demodulating the first downlink signal. The demodulation pilot signal may include: a CRS and/or a demodulation reference signal (DMRS).

In this embodiment, the base station modulates the demodulation pilot signal corresponding to the first downlink signal to an OFDM symbol location different from that of the first downlink signal. Taking a resource allocation structure shown in FIG. 1B as an example, the demodulation pilot signal corresponding to the first downlink signal may be located in one or more OFDM symbol locations of the first, second, third, eighth, ninth, tenth, and eleventh OFDM symbols. Taking a resource allocation structure shown in FIG. 1C as an example, the demodulation pilot signal corresponding to the first downlink signal may be located in one or more OFDM symbol locations in the first subframe.

Furthermore, when the first downlink signal is received by multiple user terminals at the same time, the demodulation pilot signal corresponding to the first downlink signal includes demodulation pilot signals of the multiple user terminals, and in the demodulation pilot signal corresponding to the first downlink signal, the demodulation pilot signal of at least one user terminal is multiplexed to at least one OFDM symbol location in the following multiplexing manner: time division multiplexing, code division multiplexing, frequency division multiplexing, or a hybrid multiplexing manner of the foregoing multiplexing manners.

In this embodiment, a base station differentiates first downlink data requiring a relatively low EVM index and second downlink data allowing a relatively high EVM index from downlink data, then modulates the first downlink data and the second downlink data by using two different modulation modes: DFT-S-OFDM and OFDM, respectively, and completes sending in a multiplexing manner, so that requirements of different downlink data on EVM indexes are met at the same time when sending of the downlink data to a user terminal is implemented, and the user terminal is capable of achieving good demodulation performance, thereby improving a sending rate of the downlink data, solving the problem that the sending rate of a part of the downlink data fails to be improved because of an impact of characteristics of the OFDM when the downlink data is sent by using the OFDM and a data rate of the entire downlink data is limited accordingly. Furthermore, in this embodiment, the base station notifies the user terminal of the control information of the first downlink signal, so that the user terminal knows a location of a resource used to receive the first downlink signal and a demodulation mode used for receiving the first downlink signal, which lays the foundation for the user terminal to successfully receive the first downlink signal, perform channel estimation, and complete demodulation and decoding on the first downlink signal.

Figure 3:
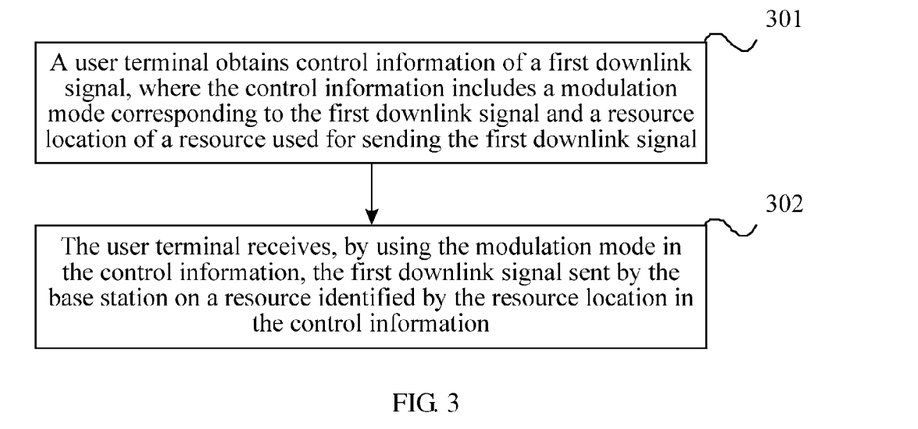
FIG. 3 is a flowchart of a method for receiving downlink data according to an embodiment of the present invention.

FIG. 3 is a flowchart of a method for receiving downlink data according to an embodiment of the present invention. As shown in FIG. 3, the method of this embodiment includes the following steps.

Step 301: A user terminal obtains control information of a first downlink signal, where the control information includes a modulation mode corresponding to the first downlink signal and a resource location of a resource used for sending the first downlink signal.

In this embodiment, the first downlink signal is generated by a base station modulating first downlink data by using a DFT-S-OFDM modulation mode and then is sent. The first downlink data includes: downlink data modulated by using 256QAM or a higher-order digital modulation mode, and/or downlink data that needs to be received by a user terminal at a cell edge and on which digital modulation is performed.

Specifically, the base station determines the first downlink data from downlink data, and then modulates the first downlink data by using the DFT-S-OFDM modulation mode, so as to generate the first downlink signal.

At the same time, the base station determines second downlink data from the downlink data, and then modulates the second downlink data by using an OFDM modulation mode, so as to generate a second downlink signal.

Then, the base station sends the first downlink signal and the second downlink signal to the user terminal in a multiplexing manner.

Before the base station sends the first downlink signal and the second downlink signal to the user terminal in the multiplexing manner, the base station sends the control information of the first downlink signal and control information of the second downlink signal to the user terminal. The control information of the first downlink signal includes the modulation mode corresponding to the first downlink signal and the resource location of the resource used for sending the first downlink signal. The modulation mode corresponding to the first downlink signal is a modulation mode used by the base station to obtain the first downlink signal through modulation, that is, the DFT-S-OFDM. The resource location of the resource used for sending the first downlink signal includes locations and the number of OFDM symbols occupied by the first downlink signal. The control information of the second downlink signal includes a modulation mode corresponding to the second downlink signal and a resource location of a resource used for sending the second downlink signal.

The base station may send the control information of the first downlink signal to the user terminal through RRC signaling. Correspondingly, by receiving the RRC signaling, the user terminal obtains the control information of the first downlink signal from the RRC signaling.

In addition, the base station may further send the control information of the first downlink signal to the user terminal through an extended or a modified PDCCH. Correspondingly, by receiving the extended or modified PDCCH, the user terminal obtains the control information of the first downlink signal from the modified or extended PDCCH.

For the several manners for the base station to send the user terminal a time-and-frequency resource for transmitting the first downlink signal in the foregoing embodiments, correspondingly, the user terminal may obtain, on a subframe, locations of all OFDM symbols occupied by the first downlink signal that needs to be received by the user terminal and the modulation mode corresponding to the first downlink signal from the RRC signaling or control signaling that is transmitted in the modified or extended PDCCH, where the subframe may be pre-specified. Alternatively, the user terminal may obtain, on each radio frame, a location of an OFDM symbol occupied in the radio frame by the first downlink signal that needs to be received by the terminal and/or the modulation mode corresponding to the first downlink signal from the RRC signaling or the modified or extended PDCCH. Alternatively, the user terminal may obtain OFDM symbols occupied in a designated number of subframes by the first downlink signal that needs to be received by the user terminal and/or the modulation mode corresponding to the first downlink signal from one piece of RRC signaling or one modified or extended PDCCH at a time.

The base station may further send the control information of the second downlink signal to the user terminal through the RRC signaling or PDCCH. Because the second downlink signal is a signal obtained through modulation performed by using the OFDM, a transmission manner thereof is the same as that in the prior art, which is not elaborated herein again.

Step 302: The user terminal receives, by using the modulation mode in the control information, the first downlink signal sent by the base station on the resource identified by the resource location in the control information.

After obtaining the control information of the first downlink signal, the user terminal may receive, according to the obtained control information, the first downlink signal sent by the base station. Specifically, the user terminal receives the first downlink signal on an OFDM symbol identified by the resource location in the control information and by using the modulation mode in the control information. Then, the user terminal performs channel estimation on the received first downlink signal, and completes demodulation and decoding on the first downlink signal.

The user terminal may further receive the second downlink signal, and a process of receiving the second downlink signal is the same as that in the prior art, which is not elaborated herein.

In the method for receiving downlink data according to this embodiment, a user terminal cooperates with a base station, control information of a first downlink signal is obtained, and the first downlink signal is received according to the obtained control information, so that the base station is capable of sending downlink data by using two modulation modes: DFT-S-OFDM and OFDM at the same time, so as to meet requirements of different downlink data on EVM indexes, and improve a data rate of the downlink data.

Figure 4:
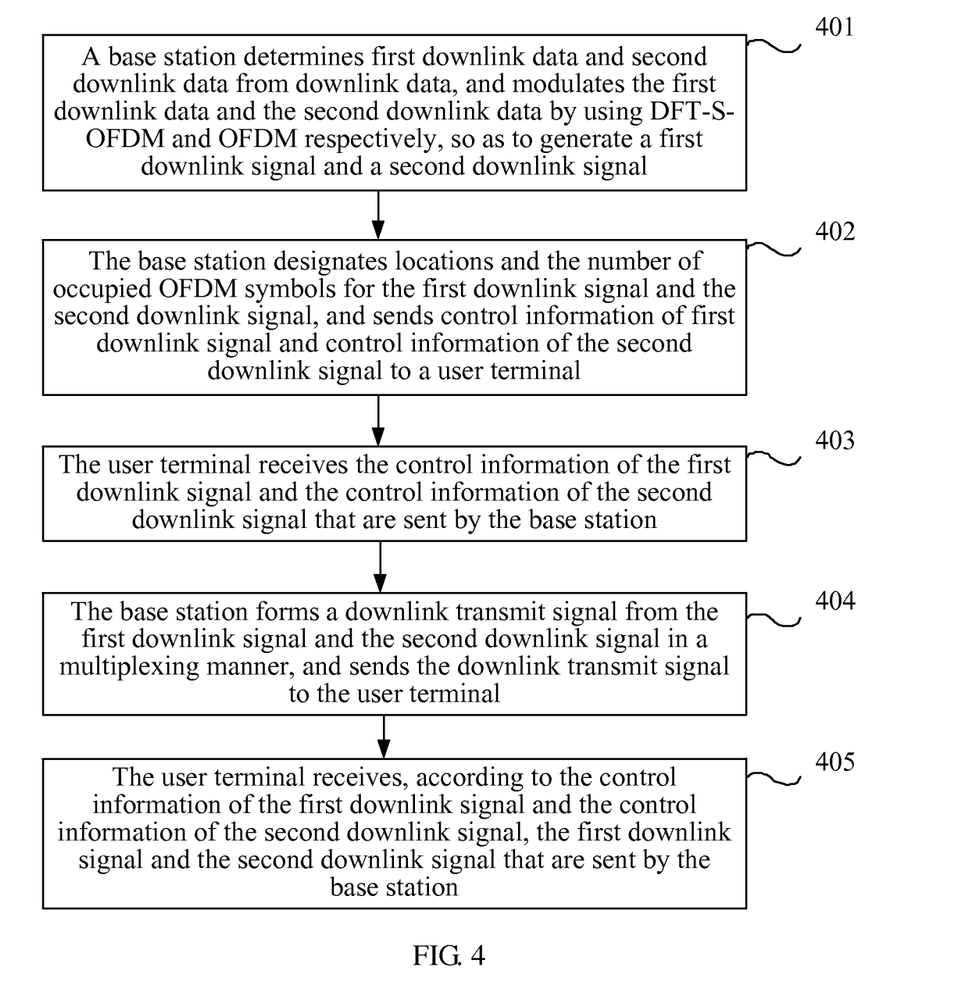
FIG. 4 is a flowchart of a method for processing downlink data according to an embodiment of the present invention.

FIG. 4 is a flowchart of a method for processing downlink data according to an embodiment of the present invention. As shown in FIG. 4, the method of this embodiment includes the following steps.

Step 401: A base station determines first downlink data and second downlink data from downlink data, and modulates the first downlink data and the second downlink data by using DFT-S-OFDM and OFDM respectively, so as to generate a first downlink signal and a second downlink signal.

Step 402: The base station designates locations and the number of occupied OFDM symbols for the first downlink signal and the second downlink signal, and sends control information of first downlink signal and control information of the second downlink signal to a user terminal.

The control information includes: the modulation mode, the designated locations and/or number of the occupied OFDM symbols, and so on.

Step 403: The user terminal receives the control information of the first downlink signal and the control information of the second downlink signal that are sent by the base station.

Step 404: The base station sends the first downlink signal and the second downlink signal to the user terminal in a multiplexing manner.

Step 405: The user terminal receives, respectively according to the control information of the first downlink signal and the control information of the second downlink signal, the first downlink signal and the second downlink signal that are sent by the base station.

For the foregoing step 401, step 402, and step 404, reference may be made to the description in the embodiment shown in FIG. 1A or FIG. 2A, so the details are not described herein again.

For the foregoing step 403 and step 405, reference may be made to the description in the embodiment shown in FIG. 3, so the details are not described herein again.

In this embodiment, a base station differentiates first downlink data requiring a relatively low EVM index and second downlink data allowing a relatively high EVM index from downlink data, then modulates the first downlink data and the second downlink data by using two different modulation modes: DFT-S-OFDM and OFDM, respectively, and completes sending in a multiplexing manner, so that requirements of different downlink data on EVM indexes are met at the same time when sending of the downlink data to a user terminal is implemented, and the user terminal is capable of achieving good demodulation performance, thereby improving a sending rate of the downlink data, solving the problem that the sending rate of a part of the downlink data fails to be improved because of an impact of characteristics of the OFDM when the downlink data is sent by using the OFDM and a data rate of the entire downlink data is limited accordingly.

Figure 5:
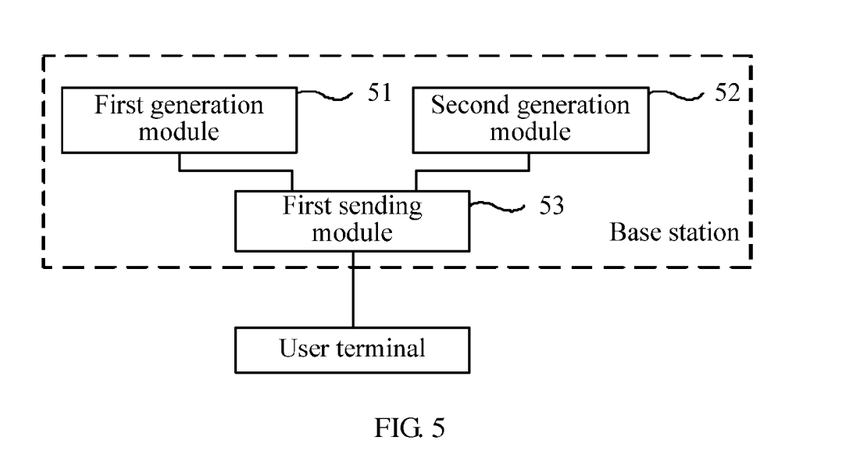
FIG. 5 is a schematic structural diagram of a base station according to an embodiment of the present invention.

FIG. 5 is a schematic structural diagram of a base station according to an embodiment of the present invention. As shown in FIG. 5, the base station in this embodiment includes: a first generation module 51, a second generation module 52, and a first sending module 53.

The first generation module 51 is configured to modulate first downlink data into a first downlink signal by using a DFT-S-OFDM modulation mode. The second generation module 52 is configured to modulate second downlink data into a second downlink signal by using an OFDM modulation mode. The first sending module 53 is connected to the first generation module 51, the second generation module 52, and a user terminal, and is configured to form, in a multiplexing manner, a downlink transmit signal from the first downlink signal generated through modulation by the first generation module 51 and the second downlink signal generated through modulation by the second generation module 52, and send the downlink transmit signal to the user terminal.

The first downlink data may include: downlink data modulated by using 256QAM or a higher-order digital modulation mode, and/or downlink data that needs to be received by a user terminal at a cell edge and on which digital modulation is performed. The second downlink data may include: downlink data that needs to be received by a user terminal at a cell center and is modulated by using a digital modulation mode lower than 256QAM.

In this embodiment, each functional module of the base station may be configured to perform the procedure of the method for sending downlink data shown in FIG. 1A, of which a specific working principle is not elaborated again, and reference may be made to the descriptions in the method embodiment.

According to the base station in this embodiment, the first generation module and the second generation module modulate first downlink data and second downlink data by using two different modulation modes: DFT-S-OFDM and OFDM, respectively, and the first sending module completes sending in a multiplexing manner, so that requirements of different downlink data on EVM indexes are met at the same time when sending of the downlink data to a user terminal is implemented, and the user terminal is capable of achieving good demodulation performance, thereby improving a sending rate of the downlink data, solving the problem that the sending rate of a part of the downlink data fails to be improved because of an impact of characteristics of the OFDM when the downlink data is sent by using the OFDM and a data rate of the entire downlink data is limited accordingly.

Figure 6:
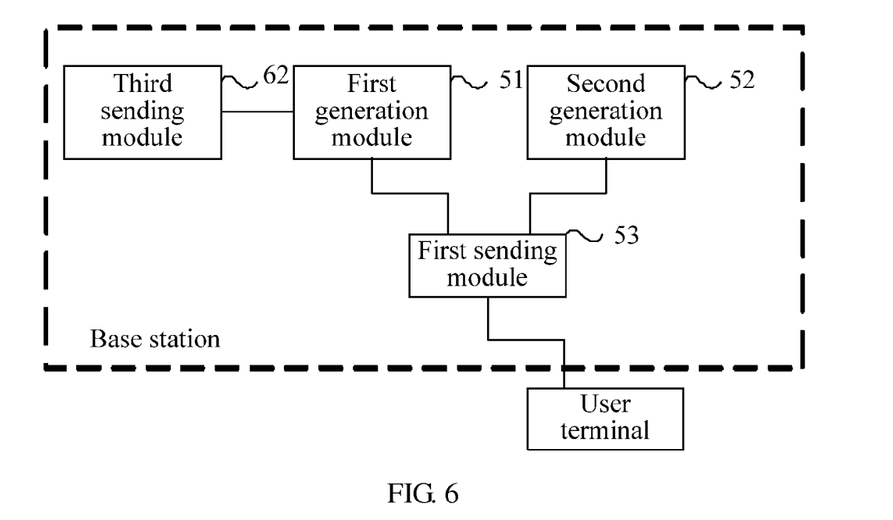
FIG. 6 is a schematic structural diagram of a base station according to another embodiment of the present invention.

FIG. 6 is a schematic structural diagram of a base station according to another embodiment of the present invention. This embodiment is implemented on the basis of the embodiment shown in FIG. 5, and as shown in FIG. 6. The first sending module 53 is connected to the user terminal, and is further configured to, before the downlink transmit signal is formed from the first downlink signal and the second downlink signal in the multiplexing manner and sent to the user terminal, send control information of the first downlink signal to the user terminal through RRC signaling, or send control information of the first downlink signal to the user terminal through an extended or a modified PDCCH, where the control information includes a modulation mode corresponding to the first downlink signal and a resource location of a resource used for sending the first downlink signal.

Furthermore, the first sending module 53 is specifically configured to send, through a subframe, locations of all OFDM symbols occupied by the first downlink signal that needs to be received by the same user terminal and the modulation mode corresponding to the first downlink signal to the user terminal. Alternatively, the first sending module 53 is specifically configured to send, through a radio frame, a location of an OFDM symbol occupied in the radio frame by the first downlink signal that needs to be received by the same user terminal and/or the modulation mode corresponding to the first downlink signal to the user terminal; the first sending module 53 is specifically configured to send, through one piece of RRC signaling or one extended or modified PDCCH, locations of OFDM symbols occupied in a designated number of subframes by the first downlink signal that needs to be received by the same user terminal and/or the modulation mode corresponding to the first downlink signal to the user terminal.

Furthermore, the base station in this embodiment further includes: a third sending module 62. The third sending module 62 is connected to the first generation module 51, and is configured to modulate a demodulation pilot signal corresponding to the first downlink signal to an OFDM symbol location different from that of the first downlink signal. The demodulation pilot signal may be a CRS or a DMRS.

The third sending module 62 is specifically configured to, when the first downlink signal is received by multiple user terminals, multiplex a demodulation pilot signal of at least one user terminal to at least one OFDM symbol location in the following multiplexing manner: time division multiplexing, code division multiplexing, frequency division multiplexing, or a hybrid multiplexing manner of the following multiplexing manners: time division multiplexing, code division multiplexing, and frequency division multiplexing.

Furthermore, the first sending module 53 in this embodiment is specifically configured to bear an OFDM symbol of the first downlink signal and an OFDM symbol of the second downlink signal in different OFDM symbol locations in a same subframe, and send at least one same subframe to the user terminal.

The first sending module 53 may be further specifically configured to send the first downlink signal and the second downlink signal to the user terminal through different subframes.

More specifically, the first sending module 53 is configured to multiplex, in a time division multiplexing or code division multiplexing manner, first downlink signals corresponding to different user terminals in the same subframe to corresponding OFDM symbol locations, and send the first downlink signals to the user terminal.

The foregoing functional modules may be configured to perform the corresponding procedures of the method for sending downlink data shown in FIG. 1A or FIG. 2A, of which a specific working principle is not elaborated again, and reference may be made to the descriptions in the method embodiment.

The base station in this embodiment modulates first downlink data and second downlink data by using two different modulation modes: DFT-S-OFDM and OFDM, respectively, and the first sending module completes sending in a multiplexing manner, so that requirements of different downlink data on EVM indexes are met at the same time when sending of the downlink data to a user terminal is implemented, and the user terminal is capable of achieving good demodulation performance, thereby improving a sending rate of the downlink data, solving the problem that the sending rate of a part of the downlink data fails to be improved because of an impact of characteristics of the OFDM when the downlink data is sent by using the OFDM and a data rate of the entire downlink data is limited accordingly.

Figure 7:
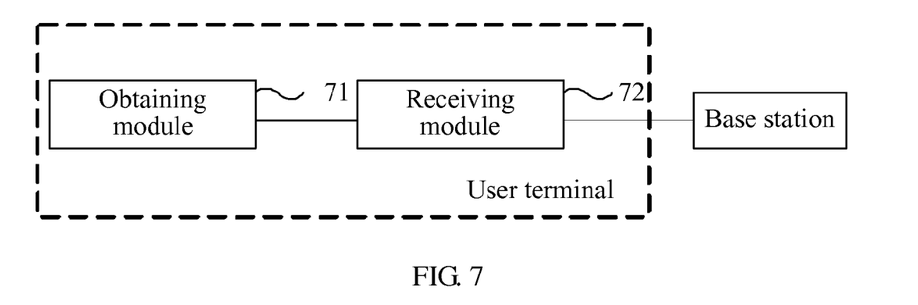
FIG. 7 is a schematic structural diagram of a user terminal according to an embodiment of the present invention.

FIG. 7 is a schematic structural diagram of a user terminal according to an embodiment of the present invention. As shown in FIG. 7, the user terminal in this embodiment includes: an obtaining module 71 and a receiving module 72.

The obtaining module 71 is configured to obtain control information of a first downlink signal, where the control information includes a modulation mode corresponding to the first downlink signal and a resource location of a resource used for sending the first downlink signal, and the first downlink signal is generated by a base station modulating first downlink data by using a DFT-S-OFDM modulation mode and then is sent. The receiving module 72 is connected to the obtaining module 71 and the base station, and is configured to receive, by using the modulation mode in the control information, the first downlink signal sent by the base station on the resource identified by the resource location in the control information obtained by the obtaining module 71.

In addition, the receiving module 72 in this embodiment may be further configured to receive another downlink signal, such as a second downlink signal obtained through modulation performed by using OFDM. More specifically, for example, the receiving module 72 may be further configured to receive a demodulation pilot signal for demodulating the first downlink signal, such as a CRS or a DMRS.

The obtaining module 71 is specifically configured to receive RRC signaling, and obtain the control information of the first downlink signal from the RRC signaling; or specifically configured to receive an extended or a modified PDCCH, and obtain the control information of the first downlink signal from the extended or modified PDCCH.

Furthermore, the obtaining module 71 is more specifically configured to obtain, on a subframe, locations of all OFDM symbols occupied by the first downlink signal that needs to be received by the user terminal and the modulation mode corresponding to the first downlink signal from the RRC signaling or the extended or modified PDCCH. Alternatively, the obtaining module 71 is more specifically configured to obtain, on each radio frame, a location of an OFDM symbol occupied in the radio frame by the first downlink signal that needs to be received by the user terminal and/or the modulation mode corresponding to the first downlink signal from the RRC signaling or the extended or modified PDCCH. Alternatively, the obtaining module 71 is more specifically configured to obtain locations of OFDM symbols occupied in a designated number of subframes by the first downlink signal that needs to be received by the user terminal and/or the modulation mode corresponding to the first downlink signal from one piece of RRC signaling or one extended or modified PDCCH.

In this embodiment, each functional module of the user terminal may be configured to perform the procedure of the method for receiving downlink data shown in FIG. 3, of which a specific working principle is not elaborated again, and reference may be made to the descriptions in the method embodiment.

The user terminal provided in this embodiment cooperates with the base station provided in the embodiments of the present invention, first obtains the control information of a first downlink signal generated by the base station modulating first downlink data by using a DFT-S-OFDM modulation mode, and then successfully receives, on an identified resource, the first downlink signal by using the DFT-S-OFDM and according to the obtained control information, so that the base station is capable of sending downlink data by using two modulation modes: DFT-S-OFDM and OFDM at the same time, thereby meeting requirements of different downlink data on EVM indexes, and improving a data rate of the downlink data.

Persons of ordinary skill in the art may understand that, all or a part of the steps in the foregoing method embodiments may be implemented by a program instructing relevant hardware. The foregoing program may be stored in a computer readable storage medium. When the program is run, the foregoing steps in the method embodiments are performed. The foregoing storage medium may be any medium capable of storing program codes, such as a ROM, a RAM, a magnetic disk, an optical disk, or the like.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not make the essence of corresponding technical solutions depart from the scope of the technical solutions of the embodiments of the present invention.

What is claimed is:

1. A method for sending downlink data, comprising:
modulating first downlink data into a first downlink signal by using a discrete Fourier transformation-spreading-orthogonal frequency division multiplexing (DFT-S-OFDM) modulation mode;
modulating second downlink data into a second downlink signal by using an orthogonal frequency division multiplexing (OFDM) modulation mode;
forming a downlink transmit signal from the first downlink signal and the second downlink signal in a multiplexing manner, wherein forming the downlink transmit signal from the first downlink signal and the second downlink signal in a multiplexing manner comprises bearing an OFDM symbol of the first downlink signal and an OFDM symbol of the second downlink signal in different OFDM symbol locations in a same subframe; and
sending the downlink transmit signal to a user terminal, wherein sending the downlink transmit signal to the user terminal comprises sending at least the same subframe to the user terminal.

2. The method for sending downlink data according to claim 1, wherein the first downlink data comprises downlink data modulated by using 256 quadrature amplitude modulation (QAM) or a higher-order digital modulation mode, and/or downlink data that needs to be received by a user terminal at a cell edge and on which digital modulation is performed, and
wherein the second downlink data comprises downlink data that needs to be received by a user terminal at a cell center and is modulated by using a digital modulation mode lower than 256QAM.

3. The method for sending downlink data according to claim 1, wherein before the forming the downlink transmit signal from the first downlink signal and the second downlink signal in a multiplexing manner, and sending the downlink transmit signal to the user terminal, the method further comprises:
sending control information of the first downlink signal to the user terminal through radio resource control protocol (RRC) signaling; and/or
sending control information of the first downlink signal to the user terminal through an extended or modified physical downlink control channel (PDCCH), wherein the control information comprises a modulation mode corresponding to the first downlink signal and a resource location of a resource used for sending the first downlink signal.

4. The method for sending downlink data according to claim 3, wherein the sending control information of the first downlink signal to the user terminal comprises:
sending, through a subframe, locations of all OFDM symbols occupied by the first downlink signal that needs to be received by a same user terminal and the modulation mode corresponding to the first downlink signal to the user terminal; or
sending, through a radio frame, a location of an OFDM symbol occupied in the radio frame by the first downlink signal that needs to be received by the same user terminal and/or the modulation mode corresponding to the first downlink signal to the user terminal; or
sending, through one piece of the RRC signaling or one piece of the extended or modified PDCCH, locations of OFDM symbols occupied in a designated number of subframes by the first downlink signal that needs to be received by the same user terminal and/or the modulation mode corresponding to the first downlink signal to the user terminal.

5. The method for sending downlink data according to claim 4, further comprising:
when the first downlink signal is received by multiple user terminals, multiplexing a demodulation pilot signal of at least one user terminal to at least one OFDM symbol location in the following multiplexing manner:
time division multiplexing, code division multiplexing, frequency division multiplexing, or a hybrid multiplexing manner of the following multiplexing manners:
time division multiplexing, code division multiplexing, and frequency division multiplexing.

6. The method for sending downlink data according to claim 1, wherein the first downlink signal and a demodulation pilot signal corresponding to the first downlink signal are located in different OFDM symbol locations.

7. A method for receiving downlink data, comprising:
obtaining control information of a first downlink signal, wherein the control information comprises a first modulation mode corresponding to the first downlink signal and a first resource location of a first resource used for sending the first downlink signal, and the first downlink signal is generated by a base station modulating first downlink data by using a discrete Fourier transformation-spreading-orthogonal frequency division multiplexing (DFT-S-OFDM) modulation mode;

receiving, by using the first modulation mode in the control information of the first downlink signal, the first downlink signal sent by the base station on the first resource identified by the first resource location in the control information of the first downlink signal;

obtaining control information of a second downlink signal, wherein the control information comprises a second modulation mode corresponding to the second downlink signal and a second resource location of a second resource used for sending the second downlink signal, and the second downlink signal is generated by the base station modulating second downlink data by using an orthogonal frequency division multiplexing (OFDM) modulation mode; and receiving, by using the second modulation mode in the control information of the second downlink signal, the second downlink signal sent by the base station on the second resource identified by the second resource location in the control information;

wherein a downlink transmit signal comprises the first downlink signal and the second downlink signal, the first downlink signal and the second downlink signal being multiplexed in a manner that an OFDM symbol of the first downlink signal and an OFDM symbol of the second downlink signal are comprised in different OFDM symbol locations in a same subframe;

wherein obtaining the control information of the first downlink signal comprises receiving radio resource control protocol (RRC) signaling or an extended or modified physical downlink control channel (PDCCH), and obtaining the control information of the first downlink signal from the RRC signaling or the extended or modified PDCCH, and wherein obtaining the control information of the first downlink signal from the RRC signaling or the extended or modified PDCCH comprises:
  obtaining, on the subframe, locations of all orthogonal frequency division multiplexing (OFDM) symbols occupied by the first downlink signal and the first modulation mode corresponding to the first downlink signal from the RRC signaling or the extended or modified PDCCH; or
  obtaining, on each radio frame, a location of an OFDM symbol occupied in the radio frame by the first downlink signal and/or the first modulation mode corresponding to the first downlink signal from the RRC signaling or the extended or modified PDCCH; or
  obtaining locations of OFDM symbols occupied in a designated number of subframes by the first downlink signal and/or the first modulation mode corresponding to the first downlink signal from one piece of the RRC signaling or one piece of the extended or modified PDCCH.

8. A base station, comprising:
a first generation module, configured to modulate first downlink data into a first downlink signal by using a discrete Fourier transformation-spreading-orthogonal frequency division multiplexing (DFT-S-OFDM) modulation mode;
a second generation module, configured to modulate second downlink data into a second downlink signal by using an orthogonal frequency division multiplexing (OFDM) modulation mode; and a first sending module, configured to form, in a multiplexing manner, a downlink transmit signal from the first downlink signal generated by the first generation module and the second downlink signal generated by the second generation module, wherein forming the downlink transmit signal from the first downlink signal and the second downlink signal in a multiplexing manner comprises bearing an OFDM symbol of the first downlink signal and an OFDM symbol of the second downlink signal in different OFDM symbol locations in a same subframe, the first sending module being further configured to send the downlink transmit signal to a user terminal, wherein sending the downlink transmit signal to the user terminal comprises sending at least the same subframe to the user terminal.

9. The base station according to claim 8, wherein the first downlink data comprises: downlink data modulated by using 256 quadrature amplitude modulation (QAM) or a higher-order digital modulation mode, and/or downlink data that needs to be received by a user terminal at a cell edge and on which digital modulation is performed; and
  the second downlink data comprises: downlink data that needs to be received by a user terminal at a cell center and is modulated by using a digital modulation mode lower than 256QAM.

10. The base station according to claim 8, wherein the first sending module is further configured to, before the downlink transmit signal is formed from the first downlink signal and the second downlink signal in the multiplexing manner and sent to the user terminal, send control information of the first downlink signal to the user terminal through radio resource control protocol (RRC signaling), or send control information of the first downlink signal to the user terminal through an extended or modified physical downlink control channel (PDCCH), wherein the control information comprises a modulation mode corresponding to the first downlink signal and a resource location of a resource used for sending the first downlink signal.

11. The base station according to claim 10, wherein the first sending module is configured to:
  send, through a subframe, locations of all OFDM symbols occupied by the first downlink signal that needs to be received by a same user terminal and the modulation mode corresponding to the first downlink signal to the user terminal; or
  send, through a radio frame, a location of an OFDM symbol occupied in the radio frame by the first downlink signal that needs to be received by the same user terminal and/or the modulation mode corresponding to the first downlink signal to the user terminal; or
  send, through one piece of the RRC signaling or one piece of the extended or modified PDCCH, locations of OFDM symbols occupied in a designated number of subframes by the first downlink signal that needs to be received by the same user terminal and/or the modulation mode corresponding to the first downlink signal to the user terminal.

12. The base station according to claim 8, further comprising:
  a third sending module, configured to modulate a demodulation pilot signal corresponding to the first downlink signal to an OFDM symbol location different from that of the first downlink signal.

13. The base station according to claim 12, wherein the third sending module is configured to, when the first downlink signal is received by multiple user terminals, multiplex the demodulation pilot signal of at least one user terminal to different OFDM symbol locations in the following multiplexing manner:
  time division multiplexing, code division multiplexing, frequency division multiplexing, or a hybrid multiplexing manner of the following multiplexing manners:
  time division multiplexing, code division multiplexing, and frequency division multiplexing.

14. A user terminal, comprising:
  a first obtaining module, configured to obtain control information of a first downlink signal, wherein the control information of the first downlink signal comprises a first modulation mode corresponding to the first downlink signal and a first resource location of a first resource used for sending the first downlink signal, and the first downlink signal is generated by a base station modulating first downlink data by using a discrete Fourier transformation-spreading-orthogonal frequency division multiplexing (DFT-S-OFDM) modulation mode;
  a second obtaining module, configured to obtain control information of a second downlink signal, wherein the control information of the second downlink signal comprises a second modulation mode corresponding to the second downlink signal and a second resource location of a second resource used for sending the second downlink signal, and the second downlink signal is generated by the base station modulating second downlink data by using a discrete Fourier transformation-spreading-orthogonal frequency division multiplexing (DFT-S-OFDM) modulation mode;
  a first receiving module, configured to receive, by using the first modulation mode in the control information of the first downlink signal, the first downlink signal sent by the base station on the first resource identified by the first resource location in the control information of the first downlink signal obtained by the first obtaining module; and
  a second receiving module, configured to receive, by using the second modulation mode in the control information of the second downlink signal, the second downlink signal sent by the base station on the second resource identified by the second resource location in the control information of the second downlink signal obtained by the second obtaining module;
  wherein the first receiving module and the second receiving module are configured to receive a downlink transmit signal comprising the first downlink signal and the second downlink signal, the first downlink signal and the second downlink signal being multiplexed in a manner that an OFDM symbol of the first downlink signal and an OFDM symbol of the second downlink signal are comprised in different OFDM symbol locations in a same subframe;
  wherein the first obtaining module is configured to receive radio resource control protocol (RRC) signaling or an extended or modified physical downlink control channel (PDCCH), and obtain the control information of the first downlink signal from the RRC signaling or the extended or modified PDCCH, and
  wherein the first obtaining module obtains the control information from the RRC signaling or the extended or modified PDCCH by:
  obtaining, on the subframe, locations of all orthogonal frequency division multiplexing (OFDM) symbols occupied by the first downlink signal and the first modulation mode corresponding to the first downlink signal from the RRC signaling or the extended or modified PDCCH; or
  obtaining, on each radio frame, a location of an OFDM symbol occupied in the radio frame by the first downlink signal and/or the first modulation mode corresponding to the first downlink signal from the RRC signaling or the extended or modified PDCCH; or
  obtaining locations of OFDM symbols occupied in a designated number of subframes by the first downlink signal and/or the first modulation mode corresponding to the first downlink signal from one piece of the RRC signaling or one piece of the extended or modified PDCCH.

15. The user terminal of claim 14, wherein the first obtaining module obtains the control information of the first downlink signal from the RRC signaling or the extended or modified PDCCH by obtaining, on the subframe, locations of all OFDM symbols occupied by the first downlink signal and the first modulation mode corresponding to the first downlink signal from the RRC signaling or the extended or modified PDCCH.

16. The user terminal of claim 14, wherein the first obtaining module obtains the control information of the first downlink signal from the RRC signaling or the extended or modified PDCCH by obtaining, on each radio frame, a location of an OFDM symbol occupied in the radio frame by the first downlink signal and/or the first modulation mode corresponding to the first downlink signal from the RRC signaling or the extended or modified PDCCH.

17. The user terminal of claim 14, wherein the first obtaining module obtains the control information of the first downlink signal from the RRC signaling or the extended or modified PDCCH by obtaining locations of OFDM symbols occupied in a designated number of subframes by the first downlink signal and/or the first modulation mode corresponding to the first downlink signal from one piece of the RRC signaling or one piece of the extended or modified PDCCH.

18. The method of claim 7, wherein obtaining the control information of the first downlink signal comprises obtaining the control information from the RRC signaling.

19. The method of claim 7, wherein obtaining the control information of the first downlink signal comprises obtaining the control information from the extended or modified PDCCH.

20. The method of claim 7, wherein obtaining the control information from the RRC signaling or the extended or modified PDCCH comprises:
  obtaining, on a subframe, locations of all orthogonal frequency division multiplexing (OFDM) symbols occupied by the first downlink signal and the modulation mode corresponding to the first downlink signal from the RRC signaling or the extended or modified PDCCH.

21. The method of claim 7, wherein obtaining the control information from the RRC signaling or the extended or modified PDCCH comprises:
  obtaining, on each radio frame, a location of an OFDM symbol occupied in the radio frame by the first downlink signal and/or the modulation mode corresponding to the first downlink signal from the RRC signaling or the extended or modified PDCCH.

22. The method of claim 7, wherein obtaining the control information from the RRC signaling or the extended or modified PDCCH comprises:

obtaining locations of OFDM symbols occupied in a designated number of subframes by the first downlink signal and/or the modulation mode corresponding to the first downlink signal from one piece of the RRC signaling or one piece of the extended or modified PDCCH.

* * * * *